(12) United States Patent
Ghalsasi et al.

(10) Patent No.: US 11,524,609 B2
(45) Date of Patent: Dec. 13, 2022

(54) SEAT ASSEMBLY FOR A VEHICLE

(71) Applicant: Magna Automotive India Private Limited, Maharashtra (IN)

(72) Inventors: Prasad Balkrishna Ghalsasi, Maharashtra (IN); Dinesh Uttamrao Ambekar, Maharashtra (IN); Avadhoot Sunil Kulkarni, Maharashtra (IN)

(73) Assignee: Magna Automotive India Private Limited, Maharashtra (IN)

( * ) Notice: Subject to any disclaimer, the term of this patent is extended or adjusted under 35 U.S.C. 154(b) by 0 days.

(21) Appl. No.: 17/147,545

(22) Filed: Jan. 13, 2021

(65) Prior Publication Data

US 2021/0213854 A1 Jul. 15, 2021

(30) Foreign Application Priority Data

Jan. 13, 2020 (IN) .............................. 202021001500

(51) Int. Cl.
*B60N 2/12* (2006.01)
*B60N 2/22* (2006.01)

(52) U.S. Cl.
CPC ................ *B60N 2/12* (2013.01); *B60N 2/22* (2013.01)

(58) Field of Classification Search
CPC ...................................................... B60N 2/12
See application file for complete search history.

(56) References Cited

U.S. PATENT DOCUMENTS

| 6,030,043 | A  | 2/2000  | Habedank |
| 6,641,214 | B2 | 11/2003 | Veneruso |
| 7,040,701 | B2 | 5/2006  | Tada |
| 7,229,118 | B2 | 6/2007  | Saberan et al. |
| 7,270,371 | B2 | 9/2007  | Adragna et al. |
| 7,484,786 | B2 | 2/2009  | Muck et al. |
| 7,568,764 | B2 | 8/2009  | Harper et al. |
| 7,637,571 | B2 | 12/2009 | Okano et al. |
| 8,662,561 | B2 | 3/2014  | Runde et al. |
| 8,833,833 | B2 | 9/2014  | Jeong et al. |
| 9,358,906 | B2 | 6/2016  | Taylor et al. |
| 10,202,056 | B2 | 2/2019 | Zimmerman, II |

(Continued)

FOREIGN PATENT DOCUMENTS

| CN | 106394322 A | * | 2/2017 |
| DE | 10225736    |   | 1/2004 |

(Continued)

*Primary Examiner* — Timothy J Brindley

(74) *Attorney, Agent, or Firm* — Miller Canfield

(57) ABSTRACT

A seat assembly for use in a vehicle is repositionable between a design seating position, a folded position, and a slouch position. The seat assembly comprises a seatback fixedly coupled to a first recliner bracket, a seat cushion having a cushion bracket, a recliner pivotally connecting a second recliner bracket to the first recliner bracket, and a hockey stick assembly pivotally connected to the seatback and the first recliner bracket through the recliner and the second recliner bracket. The cushion bracket is pivotally connected to the hockey stick assembly and the second recliner bracket through a free pivot joint. The seat cushion is coupled to a track that is slidably coupled to a fixed track. The hockey stick assembly repositions the seatback between the design seating position and the slouch position as the track slides along the fixed track.

17 Claims, 13 Drawing Sheets

(56) References Cited

U.S. PATENT DOCUMENTS

| | | | | |
|---|---|---|---|---|
| 10,518,663 B1* | 12/2019 | Kakishima | .............. | B60N 2/305 |
| 2011/0049958 A1* | 3/2011 | Ma | ......................... | B60N 2/309 |
| | | | | 297/378.12 |

FOREIGN PATENT DOCUMENTS

| | | | | | |
|---|---|---|---|---|---|
| DE | 102005021203 | | 5/2007 | | |
| DE | 102013006485 | A1 * | 11/2013 | .............. | B60N 2/12 |
| KR | 20200021618 | A * | 3/2020 | | |
| WO | 2008117312 | | 11/2008 | | |

* cited by examiner

SEAT ASSEMBLY FOR A VEHICLE

CROSS-REFERENCE TO RELATED APPLICATIONS

This application claims priority to and all the benefits of India Patent Application 202021001500, filed Jan. 13, 2020, and entitled "A Seat Assembly for a Vehicle", the disclosure of which is hereby incorporated by reference in its entirety.

BACKGROUND OF THE INVENTION

1. Field of the Invention

The present disclosure relates to seats for motor vehicles, and particularly to a rear body structure comprising a seat with a common pivot construction between a seatback, a seat cushion, and a hockey stick assembly.

2. Description of Related Art

The need for improved systems within the car seat has been increasing continuously. In many instances, a seat will be located with its seatback directly adjacent to a wall of the vehicle cabin and/or adjacent to parts of the vehicle cabin. The seat can have either a "stadium" configuration where the seatback and seat cushion can be folded to an upright stowed position, or the seat can have a "slouch" configuration where the seatback and seat cushion can be shifted forward to a comfort position. The slouch seat configuration typically has a seatback with a lower portion that slides forward as an upper portion of the seatback slides downward. Further, the slouch seat configuration typically includes a forward movement of the seat cushion along with the seatback motion. In certain conventional seats, a recliner pivotally couples the lower portion of the seatback to the seat cushion. The recliner allows for forward and rearward rotational adjustment of the seatback. Although these conventional seatback designs work reasonably well, they tend to use various additional components, such as seatback striker rods, guiding elements, bars, latches, pivots, recliners, etc., that add cost and complexity to the seatback designs. Therefore, there is a need for a free-standing seat that avoids the increased cost and complexity by eliminating excessive components, such as the seatback striker rods, bars, latches, pivots, recliners, and the like.

The principal objective of the embodiments disclosed herein is to provide a seat having a common pivot construction between the seatback, the seat cushion, and the hockey stick assembly. Another objective of the embodiments disclosed herein is to provide a free-standing seat that lacks excessive components, such as seatback striker rods, bars, latches, pivots, recliners, and the like. An additional objective of the embodiments disclosed herein is to provide control of seatback orientation by using a slot in a guide bracket. A further objective of the embodiments disclosed herein is to provide a slouch function with an independent seatback fold function. Another objective of the embodiments disclosed herein is to provide the slouch function and/or the seatback fold function using mechanical locking devices or power operated motor(s).

SUMMARY OF THE INVENTION

The present invention relates to a seat assembly for a vehicle that is repositionable between a design seating position, a folded position, and a slouch position. The seat assembly comprises a seatback, a first recliner bracket fixedly coupled to the seatback, a seat cushion having a cushion bracket, a recliner pivotally connecting a second recliner bracket to the first recliner bracket, and a recliner release lever to operate the recliner for folding the seatback. The seat assembly further includes a hockey stick assembly pivotally connected to the seatback and the first recliner bracket through the recliner and the second recliner bracket. The cushion bracket is pivotally connected to the hockey stick assembly and the second recliner bracket through a free pivot joint. The seat cushion is coupled to a track that is slidably coupled to a fixed track wherein the cushion bracket and the hockey stick assembly slide along with the track as the track slides along the fixed track. The hockey stick assembly repositions the seatback between the design seating position and the slouch position as the track slides along the fixed track.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

FIGS. 1-18 illustrate a seat assembly 10 repositionable between a design seating position 30, a slouch position 34, and a folded position 38, 38' according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views. The embodiments disclosed herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The accompanying drawings are used to help easily understand various technical features. It should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
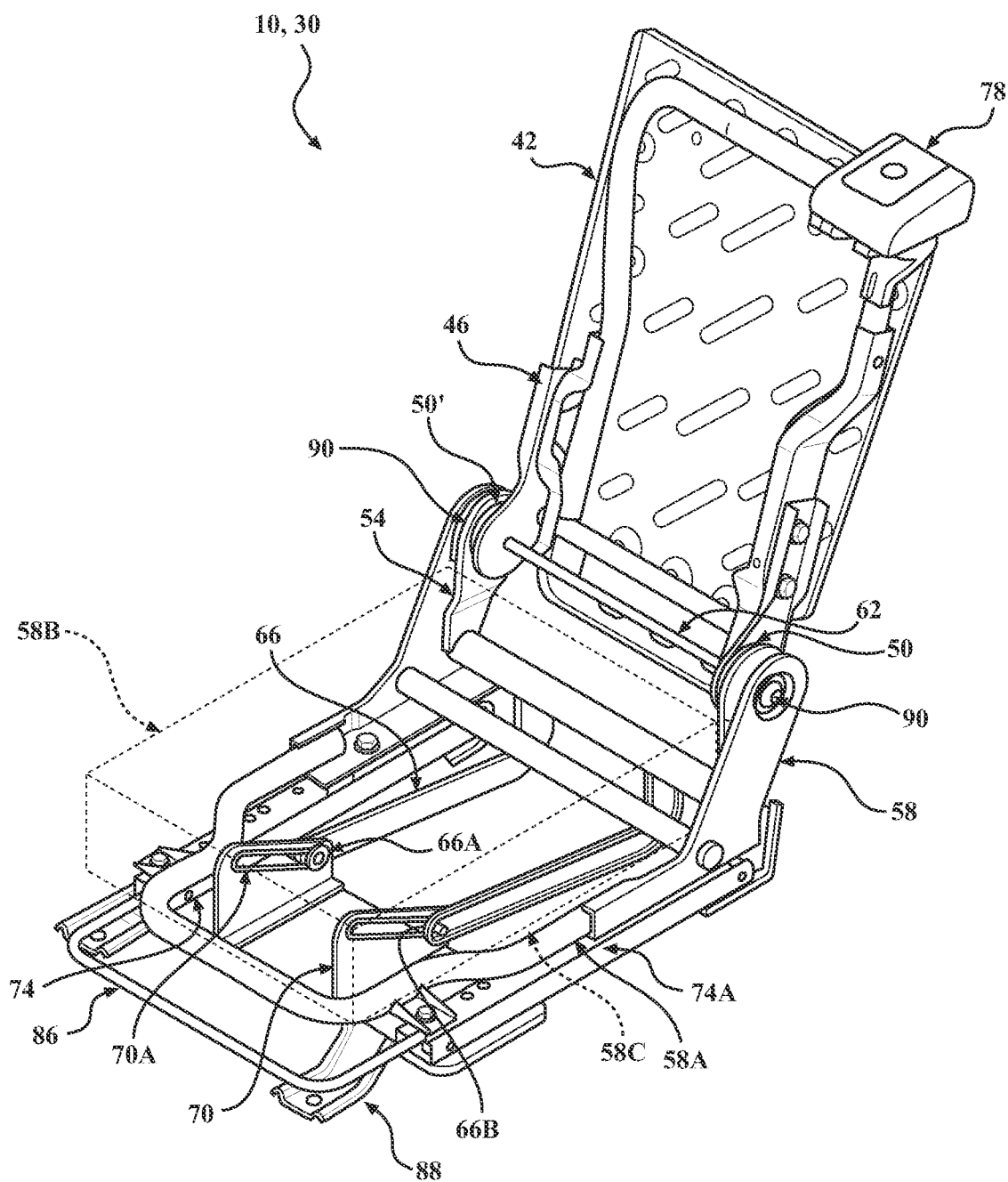
FIG. 1 illustrates a perspective view of a seat assembly for a vehicle, according to one embodiment of the present invention.

FIG. 1 illustrates a seat assembly 10 for a vehicle, according to embodiments as disclosed herein. The seat assembly 10 is shown positioned in the design seating position 30 in FIG. 1. The seat assembly 10 comprises, in part, a seatback 42, a first recliner bracket 46, a recliner 50, a second recliner bracket 54, a cushion bracket 58, a cushion frame 58A, a synchronization rod 62, a hockey stick assembly 66, a guide bracket 70, a track 74, a fixed track 74A, a recliner lever 78 that can be mounted at different locations on the seat assembly 10, a recliner release lever 82 (see FIG. 5), a towel bar 86, and a seat base 88. The first recliner bracket 46 is fixedly coupled to the seatback 42 and pivotally coupled to the recliner 50. In addition, the recliner 50 is pivotally connected to the second recliner bracket 54.

Also shown in FIG. 1, the hockey stick assembly 66 is fixedly coupled to the second recliner bracket 54. Therefore, the hockey stick assembly 66 is pivotally connected to the seatback 42 and the first recliner bracket 46 through the recliner 50 and the second recliner bracket 54. In addition, the hockey stick assembly 66 has a boss 66A projecting away from the hockey stick assembly 66 near a forward end 66B of the hockey stick assembly 66. The boss 66A is configured to pass at least partially through a slot 70A in the guide bracket 70. The guide bracket 70 is fixedly coupled to the seat base 88 and/or is fixedly coupled to the fixed track 74A. The cushion bracket 58 is pivotally connected to the second recliner bracket 54 and the hockey stick assembly 66 through a free pivot joint 90. More specifically, the hockey stick assembly 66 is fixedly coupled to the second recliner bracket 54 with the second recliner bracket 54 pivotally connected to the cushion bracket 58 through the free pivot joint 90.

Referring to FIG. 1, the cushion brackets 58 and the cushion frame 58A support a seat pad 58B. As a group, the cushion brackets 58, the cushion frame 58A, and the seat pad 58B combine to form a seat cushion 58C. The recliner release lever 82 (shown in FIG. 5) is provided to operate the recliner 50 for pivoting and folding of the seatback 42. Further, the towel bar 86 and the track 74 are configured such that movement of the towel bar 86 unlocks the track 74 so that the track 74 can slide along the fixed track 74A. The cushion bracket 58 and the hockey stick assembly 66 slide along with the track 74 when the seat cushion 58C is repositioned along the fixed track 74A. The guide bracket 70 does not change position with respect to the fixed track 74A when the seat cushion 58C is repositioned along the fixed track 74A. In one embodiment, the fixed track 74A and the guide bracket 70 are fixedly coupled to the seat base 88.

Unlike certain conventional seats, a common pivot construction is provided between the seatback 42, the cushion brackets 58, and the hockey stick assembly 66 through second recliner brackets 54. The seat assembly 10 shown in FIG. 1 lacks excessive components such as seatback striker rods, bars, latches, pivots, recliners, and the like. Certain conventional seat systems include a 4-bar linkage mechanism in either the seatback 42 or the seat cushion 58C. Further, these conventional seat systems include a seatback high latch for locking the seatback 42. The seat assembly 10 shown in FIG. 1 does not include a seatback high latch for locking the seatback 42 and/or for initiating movement to the slouch position 34. Also, the seatback 42 of the seat assembly 10 is freely pivoted at the recliner 50.

Figure 2:
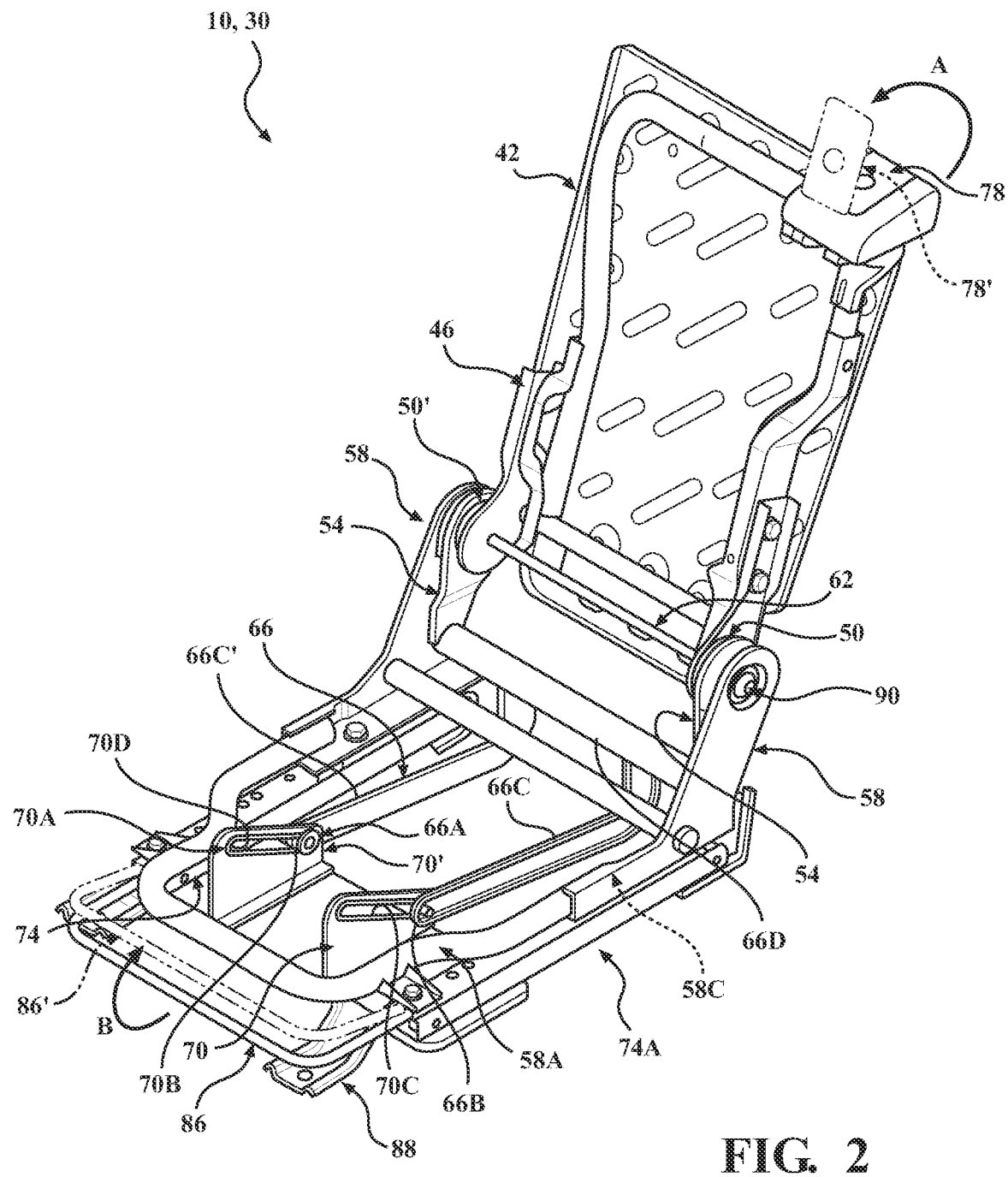
FIG. 2 shows the seat assembly of FIG. 1, illustrating operation of a recliner lever and operation of a towel bar to reposition the seat assembly.

FIG. 2 illustrates operation of the recliner lever 78 to fold the seatback 42, according to embodiments as disclosed herein. The seat assembly 10 is shown in the design seating position 30 in FIG. 2. The seatback 42 is in an upright position when the seat assembly 10 is in the design seating position 30. The recliner lever 78 is actuated, as shown in FIG. 2, by rotating the recliner lever 78 to an actuated position indicated by 78' and illustrated by arrow A, to fold the seatback 42 towards the seat cushion 58C and to place the seat assembly 10 in the folded position 38 (shown in FIG. 11). More specifically, actuating the recliner lever 78 moves the recliner 50 to an unlocked condition that thereby allows the seatback 42 to be rotated towards the seat cushion 58C.

Figure 9A:
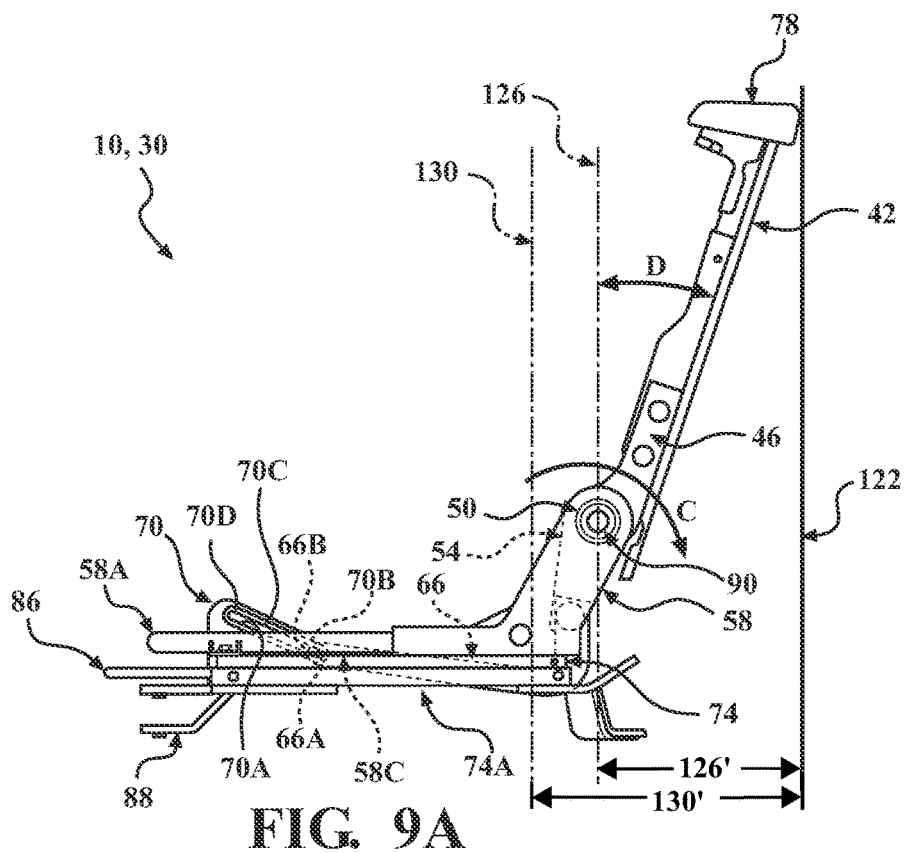
FIGS. 9A and 9B show the seat assembly of FIG. 1 in a design seating position and in a slouch position, respectively.
Figure 9B:
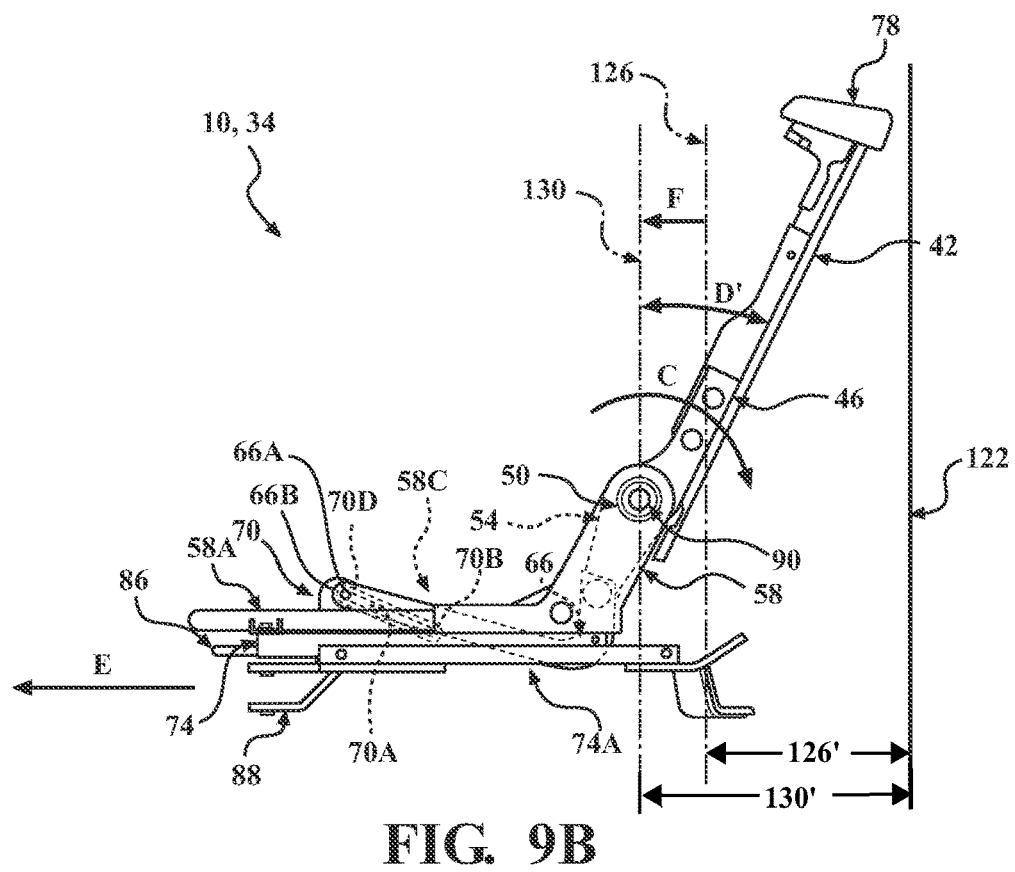

Also shown in FIG. 2, the towel bar 86 is actuated, by rotating the towel bar 86 to an actuated position indicated by 86' and illustrated by arrow B, to unlock the track 74 and reposition the seat assembly 10 into the slouch position 34 (shown in FIG. 9B). The seat assembly 10 is shown in the slouch position 34 and the folded position 38 in FIGS. 9B and 11, respectively.

Unlike certain conventional seats, the seatback 42 and the first recliner bracket 46 are connected to the hockey stick assembly 66 through the recliner 50 and the second recliner bracket 54, as shown in FIG. 2. The hockey stick assembly 66 and the second recliner bracket 54 are connected to the cushion bracket 58 through the free pivot joint 90. When the towel bar 86 is actuated, the track 74 is unlocked allowing the seat cushion 58C to slide forward along the fixed track 74A. The cushion bracket 58 and the hockey stick assembly 66 travel along with the track 74 as the seat cushion 58C is moved along the fixed track 74A. The boss 66A of the hockey stick assembly 66 is guided to travel in the slot 70A in the guide bracket 70 such that the hockey stick assembly 66 rotates the seatback 42 and repositions the seat assembly 10 into the slouch position 34. More specifically, the hockey stick assembly 66 is guided to travel in the guide bracket 70 such that the seatback 42 moves between the design seating position 30 and the slouch position 34. The towel bar 86 is actuated to unlock the track 74 which slides the seat cushion 58C forward on the fixed track 74A. The cushion bracket 58 and the hockey stick assembly 66 slide forward with the track 74 as the track 74 slides along the fixed track 74A.

Also shown in FIG. 2, the hockey stick assembly 66 comprises a first hockey stick bracket 66C and a second hockey stick bracket 66C' connected to a crossmember 66D. The crossmember 66D is fixedly coupled to and extends between opposing second recliner brackets 54. A boss 66A projects from each hockey stick bracket 66C, 66C' and passes at least partially through the slot 70A in the respective guide bracket 70, 70'. Each boss 66A is guided along the respective slot 70A for adjusting the seat assembly 10 between the design seating position 30 and the slouch position 34. The seat assembly 10 is incrementally adjustable between the design seating position 30 and the slouch position 34 with the amount of change in the position of the seatback 42 determined by the position of the bosses 66A within the slot 70A of the respective guide bracket 70, 70'. While the hockey stick assembly 66 is shown in FIG. 2 as having two hockey stick brackets 66C, 66C', the hockey stick assembly 66 can include any number of hockey stick brackets 66C, 66C', including one, two, three, or more hockey stick brackets 66C, 66C', as non-limiting examples.

Figure 3:
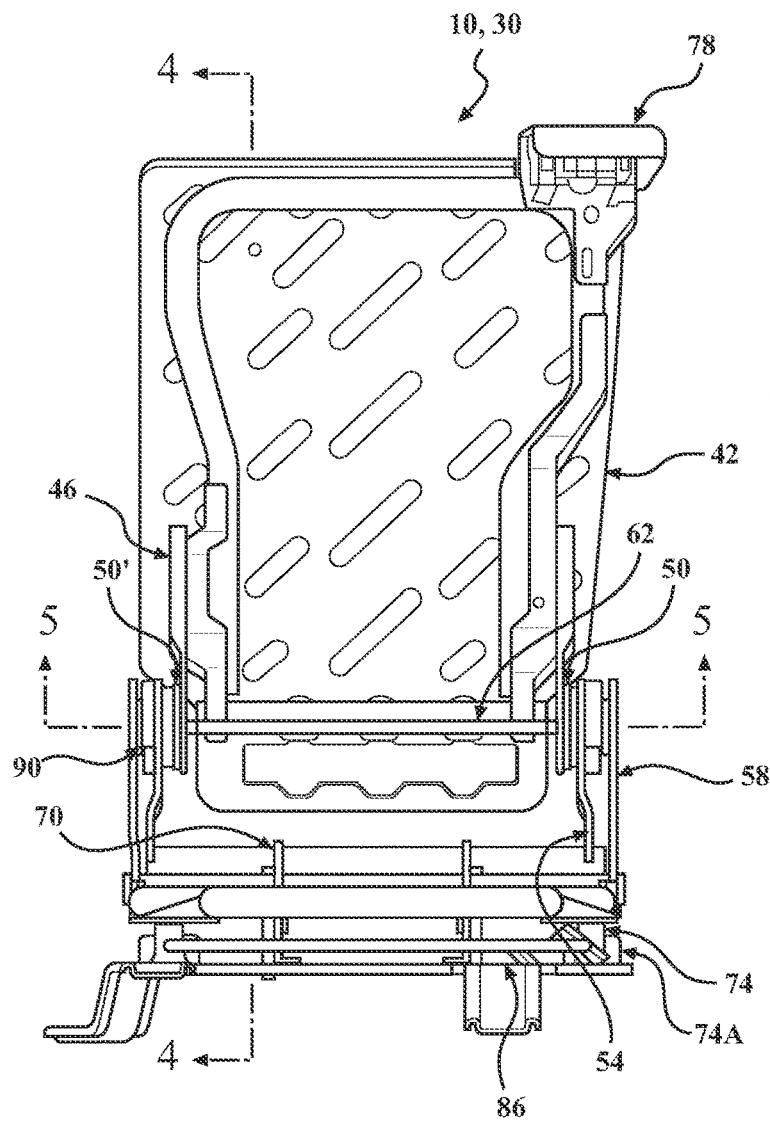
FIG. 3 shows a front view of the seat assembly of FIG. 1 having a free pivot between a second recliner bracket and a cushion bracket and having a dual-sided recliner configuration, according to one embodiment of the present invention.
Figure 4:
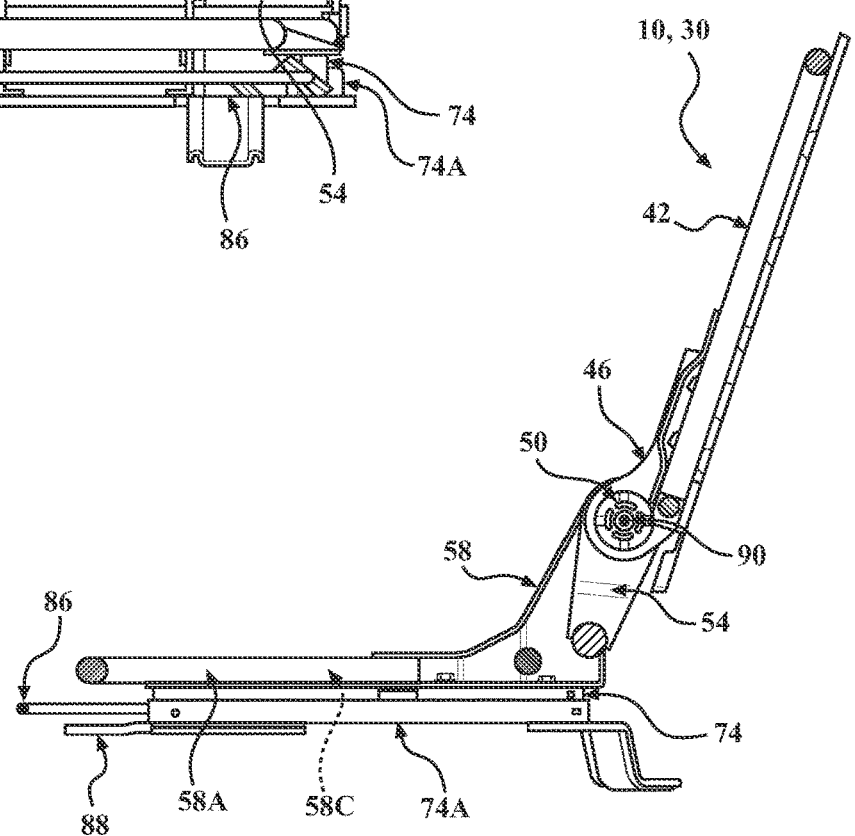
FIG. 4 illustrates a cross-sectional view of the seat assembly of FIG. 3 taken along section line 4-4.
Figure 5:
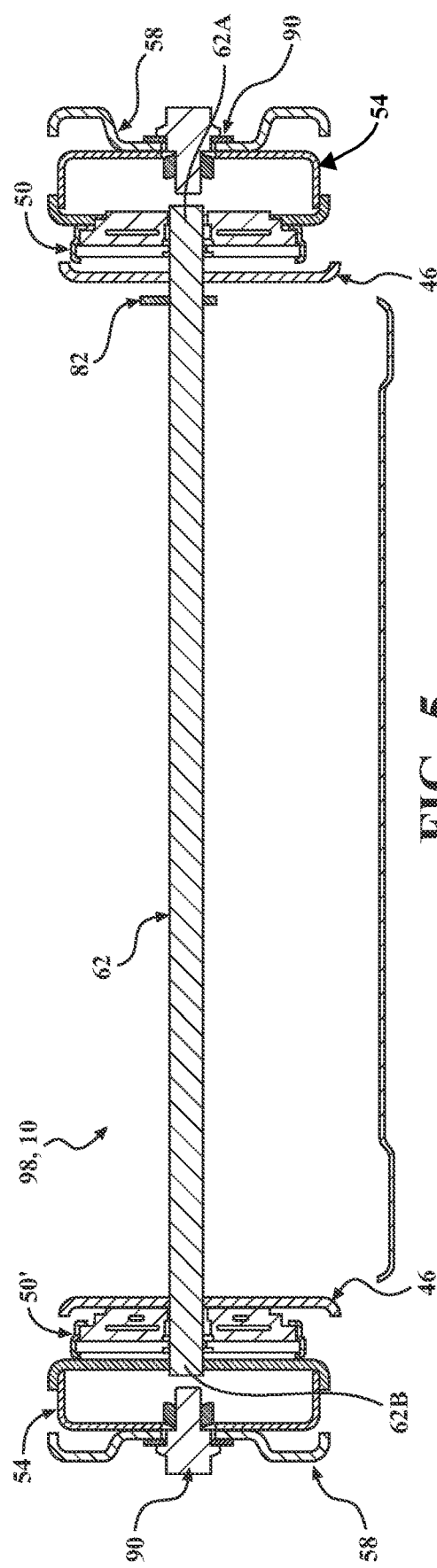
FIG. 5 illustrates a cross-sectional view of the seat assembly of FIG. 3 taken along section line 5-5.

FIG. 3 shows a front view of the seat assembly 10 of FIG. 2. FIG. 4 is a cross-sectional view of the seat assembly 10 of FIG. 3 taken along section line 4-4. Referring to FIG. 4, the seatback 42 is fixedly coupled to the first recliner bracket 46. The first recliner bracket 46 is rotatably coupled to the second recliner bracket 54 and to the cushion bracket 58 by way of the recliner 50. A cross-sectional view taken along section line 5-5 of the seat assembly 10 of FIG. 3 is shown in FIG. 5. In the embodiment shown in FIG. 5, the first recliner bracket 46 and the second recliner bracket 54 are pivotally connected together through recliner 50. The second recliner bracket 54 is pivotally connected to the cushion bracket 58 by a free pivot joint 90. FIG. 5 shows a dual-sided recliner configuration 98 having a recliner 50, 50' near each end 62A, 62B of the synchronization rod 62. The synchronization rod 62 operatively couples the opposing recliners 50, 50'. In other embodiments of the dual-sided recliner configuration 98, the opposing recliners 50, 50' can be operatively coupled using a cable (not shown) in place of the synchronization rod 62.

Figure 6:
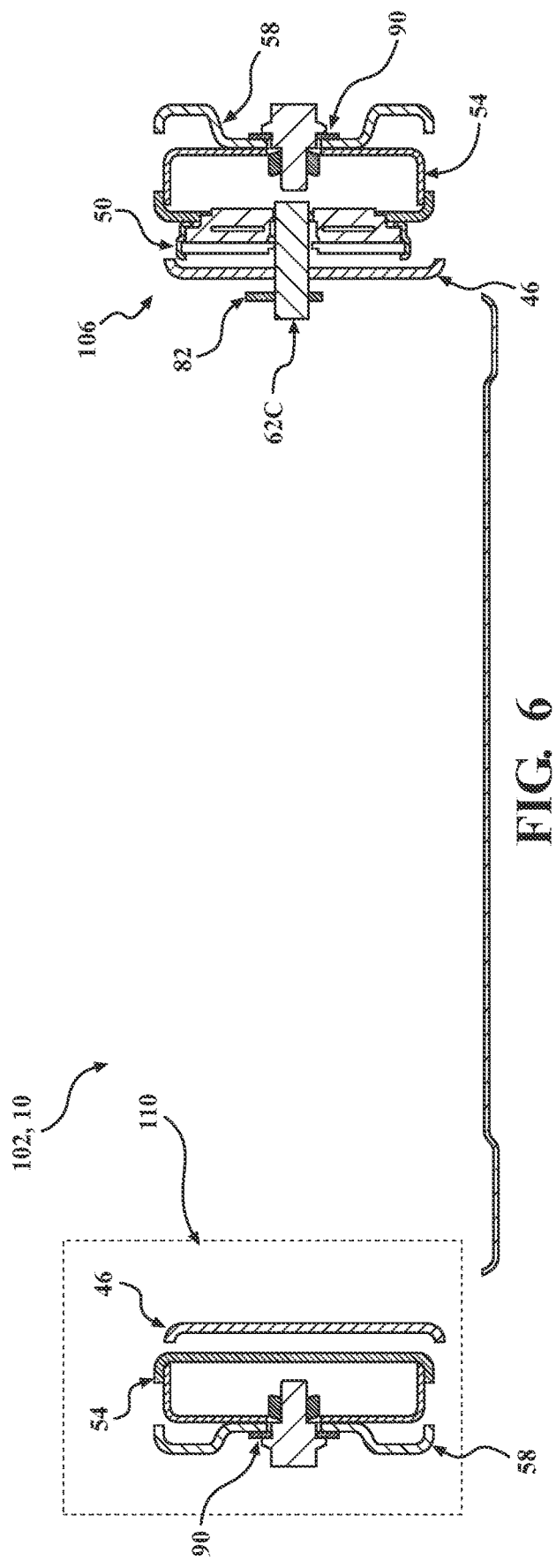
FIG. 6 shows a cross-sectional view of an alternative embodiment of the seat assembly of FIG. 3 having a single-sided recliner configuration and taken along section line 5-5.

An alternative embodiment is shown in FIG. 6 having a single-sided recliner configuration 102. The single-sided recliner configuration 102 includes a single recliner 50 on one side 106 of the seat assembly 10 between one of the first recliner brackets 46 and the adjacent second recliner bracket 54. The first recliner bracket 46 and adjacent second recliner bracket 54 on the opposing side 110 of the seat assembly 10 lack a recliner 50 when the single-sided recliner configuration 102 is selected. The synchronization rod 62 of FIG. 5 has been replaced by a shorter rod 62C projecting from the single recliner 50 in FIG. 6.

Also shown in FIGS. 5 and 6, the recliner release lever 82 is fixedly coupled to the synchronization rod 62 and the rod 62C, respectively. When the recliner lever 78 is moved to the actuated position 78', the recliner release lever 82 is rotated to unlock the one or more recliners 50, 50' and allow the seatback 42 to be repositioned.

Figure 7:
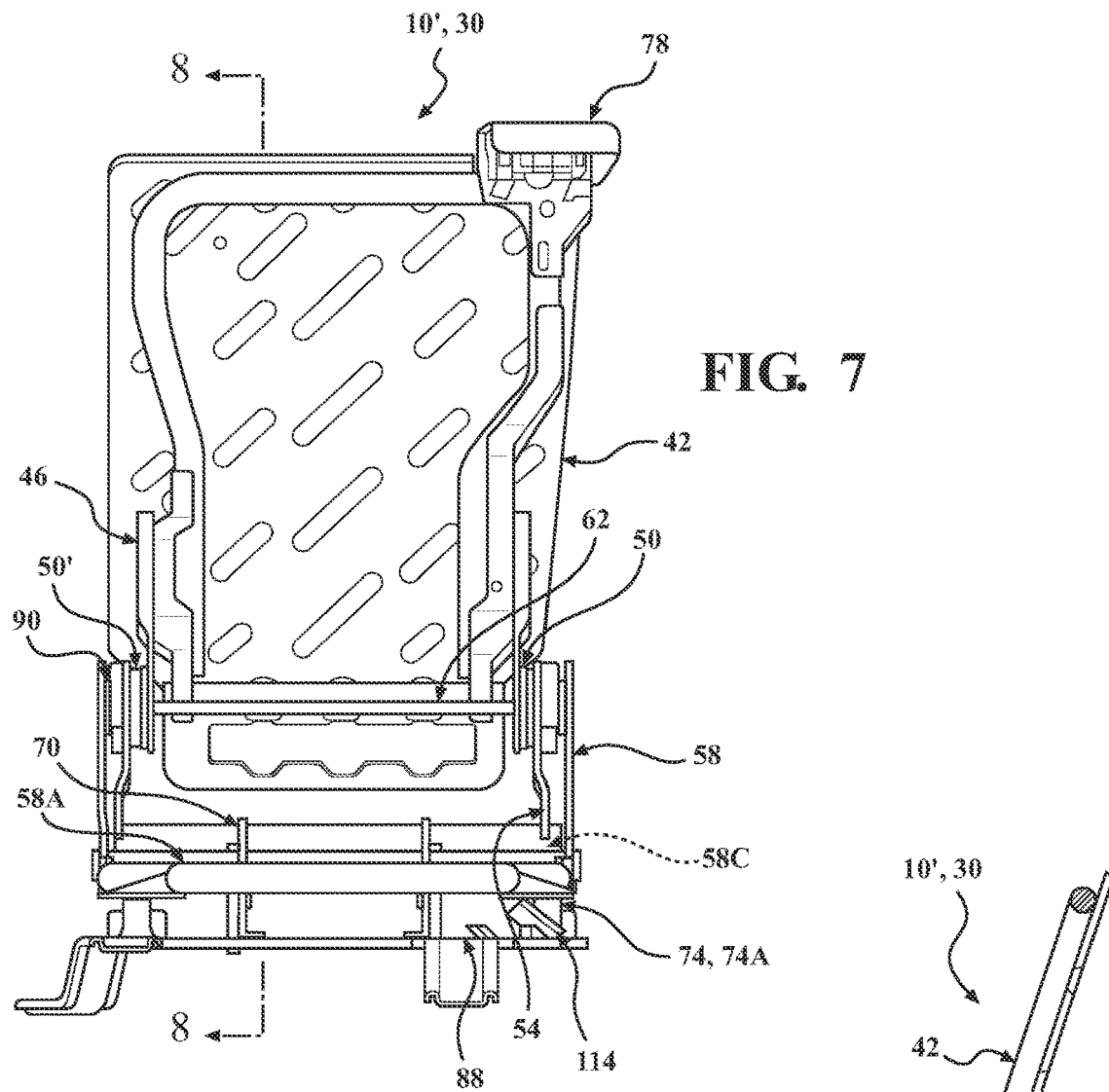
FIG. 7 illustrates an alternate embodiment of the seat assembly of FIG. 3 having a power track system.
Figure 8:
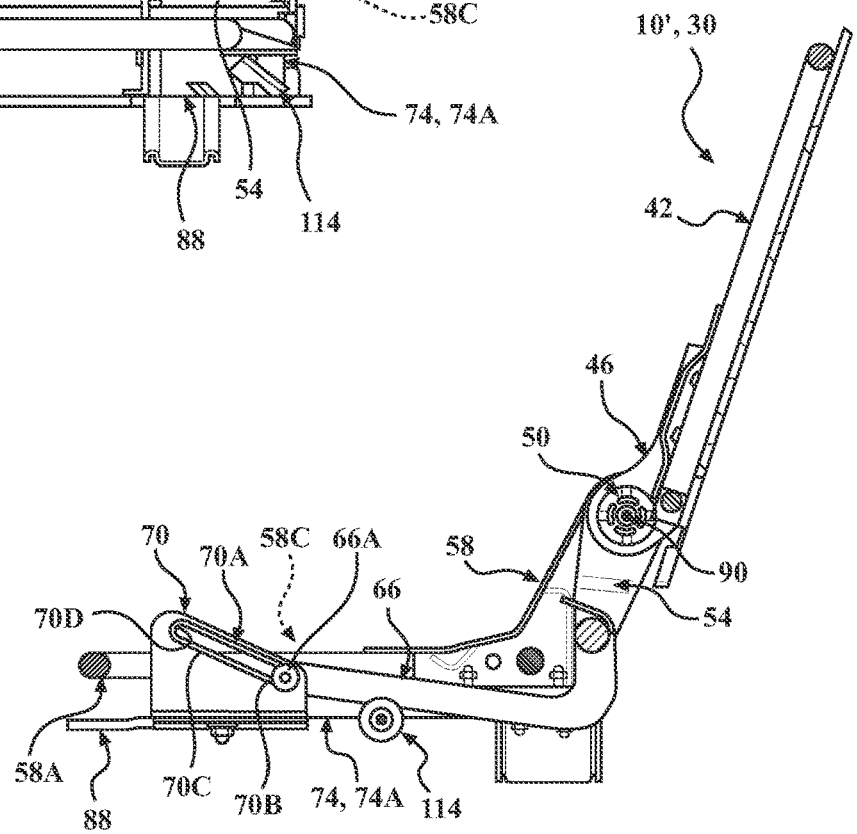
FIG. 8 shows a cross-sectional view of the seat assembly of FIG. 7 taken along section line 8-8, illustrating the power track system.

FIG. 7 shows an alternate embodiment of the seat assembly 10' of FIG. 3 having a power track 114. FIG. 8 is a cross-sectional view of the seat assembly 10' of FIG. 7 taken along section line 8-8, according to embodiments as disclosed herein. As shown in FIG. 8, the track 74 comprises a power track 114 configured to slide the seat cushion 58C on the power track 114. The cushion bracket 58 and the hockey stick assembly 66 slide along with the power track 114. The guide bracket 70 is fixedly coupled to the seat base 88 and does not slide along with the power track 114, the cushion bracket 58, and the hockey stick assembly 66. When the power track 114 is operated, the seat cushion 58C slides forward/rearward along the power track 114. The cushion bracket 58 and the hockey stick assembly 66 slide along with the power track 114 such that the boss 66A projecting from the hockey stick assembly 66 is guided to travel in the slot 70A of the guide bracket 70 to rotate the seatback 42 and to provide the slouch position 34.

In the embodiment shown in FIG. 8 having the power track 114 and in the embodiment shown in FIG. 1 having the towel bar 86 to unlock the track 74, the guide bracket 70 is fixedly coupled to the seat base 88 and does not slide along with the track 74, 114 when the seat cushion 58C is repositioned. In both these embodiments 10, 10', when seat cushion 58C is repositioned along the fixed track 74A, the boss 66A projecting from hockey stick assembly 66 is guided to travel within the slot 70A in the guide bracket 70.

Unlike certain conventional seats, the orientation of the seatback 42 of the seat assembly 10 is controlled using a slot 70A in the guide bracket 70, as illustrated in FIGS. 9A and 9B. The functionality of moving the seat assembly 10 to the slouch position 34 and the folded position 38 is further described with respect to FIG. 9A through FIG. 15. FIGS. 9A and 9B show the seat assembly 10 of FIG. 1 in the design seating position 30 and the slouch position 34, respectively, according to embodiments as disclosed herein.

Turning to FIG. 9A, the seat assembly 10 is shown in the design seating position 30 with the seatback 42 adjacent a wall 122 with the recliner 50 spaced a first predefined distance 126' away from the wall 122. In other embodiments, the wall 122 can be other restrictions or blocking surfaces near the seat assembly 10 that restrict the movement of the seat assembly 10. When the seat assembly 10 is in the design seating position 30 shown in FIG. 9A, the forward end 66B of the hockey stick assembly 66 is positioned such that the boss 66A projecting from the hockey stick assembly 66 is near a lower end 70B of the slot 70A.

As illustrated in FIG. 9A, when the seat assembly 10 is in the design seating position 30, the seatback 42 has a rotational angle D with respect to a first imaginary vertical line 126 defined through the recliner 50 and spaced a first predefined distance 126' away from the wall 122. Clockwise rotational movement of the seatback 42 about the recliner 50, as viewed in FIG. 9A and illustrated by arrow C, is restricted by the seatback 42 contacting the wall 122.

When the seat assembly 10 is in the design seating position 30 shown in FIG. 9A and while the recliner 50 is in a locked condition, the towel bar 86 is actuated to unlock the track 74 which slides the seat cushion 58C forward along the fixed track 74A to the position shown in FIG. 9B. The movement of the seat cushion 58C in the direction of arrow E shown in FIG. 9B repositions the seat assembly 10 into the slouch position 34. The cushion bracket 58 travels with the seat cushion 58C as the seat cushion 58C is repositioned along the fixed track 74A. The hockey stick assembly 66 is pivotally connected with the cushion bracket 58 through second recliner brackets 54. Since the guide bracket 70 is fixedly coupled to the seat base 88, as the track 74 slides forward in the direction of arrow E, the boss 66A of the hockey stick assembly 66 slides upward along the slot 70A in the guide bracket 70, causing the second recliner bracket 54 to rotate in a clockwise direction (arrow C) with respect to the free pivot joint 90. The clockwise rotation of the second recliner bracket 54 results in the seatback 42 being rotated in a clockwise direction with respect to the free pivot joint 90.

As shown in FIG. 9B, when the boss 66A reaches an upper end 70D of the slot 70A, the recliner 50 is spaced a second predefined distance 130' away from the wall 122. The horizontal movement of the recliner 50 between the first predefined distance 126' and the second predefined distance 130' is illustrated by arrow F. The seatback 42 has a rotational angle D' with respect to a second imaginary vertical line 130 defined through the recliner 50 and spaced the second distance 130' away from the wall 122. The rotational angle D' of the seat assembly 10 in the slouch position 34 is greater than the rotational angle D of the seat assembly 10 in the design seating position 30.

Figure 10:
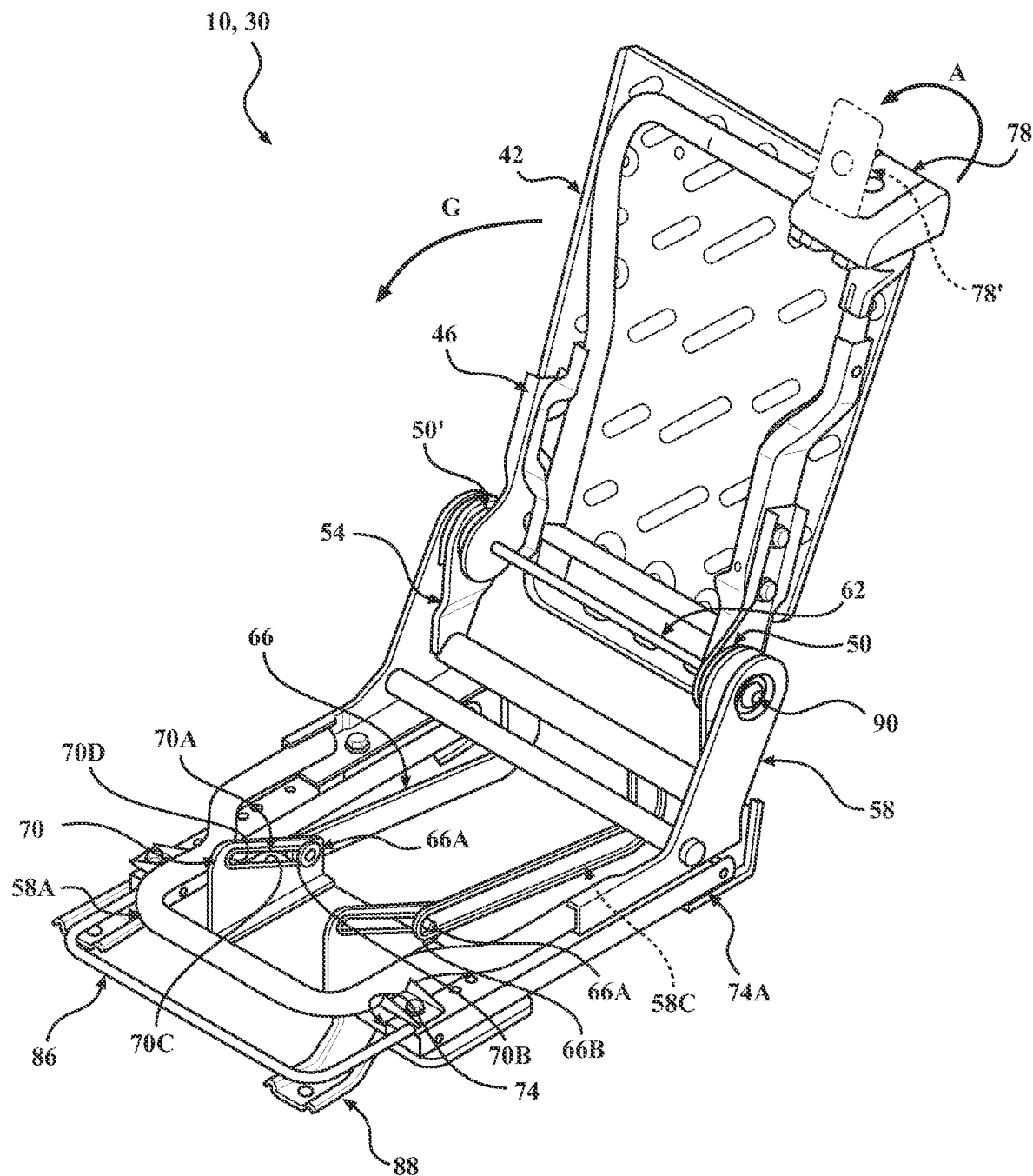
FIG. 10 is a perspective view of the seat assembly of FIG. 9A in the design seating position, illustrating the recliner lever being actuated.
Figure 11:
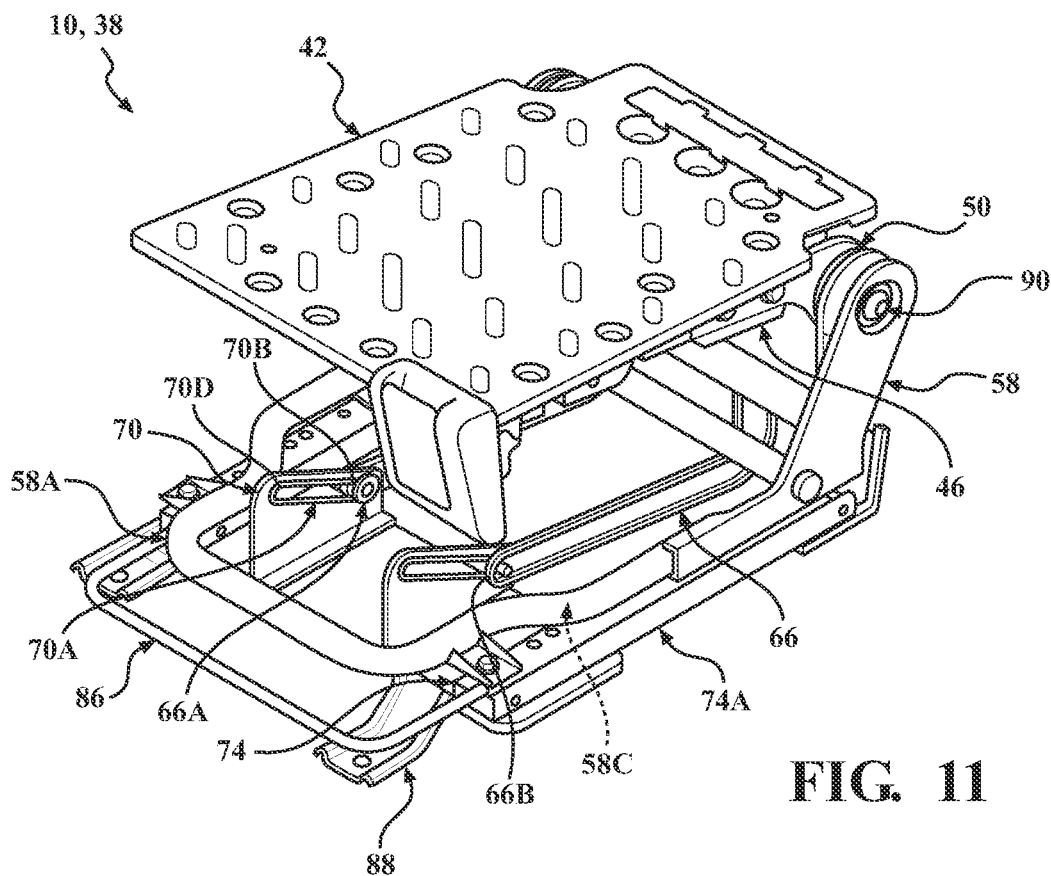
FIG. 11 is a perspective view of the seat assembly of FIG. 10 repositioned from the design seating position to a first folded position.
Figure 12:
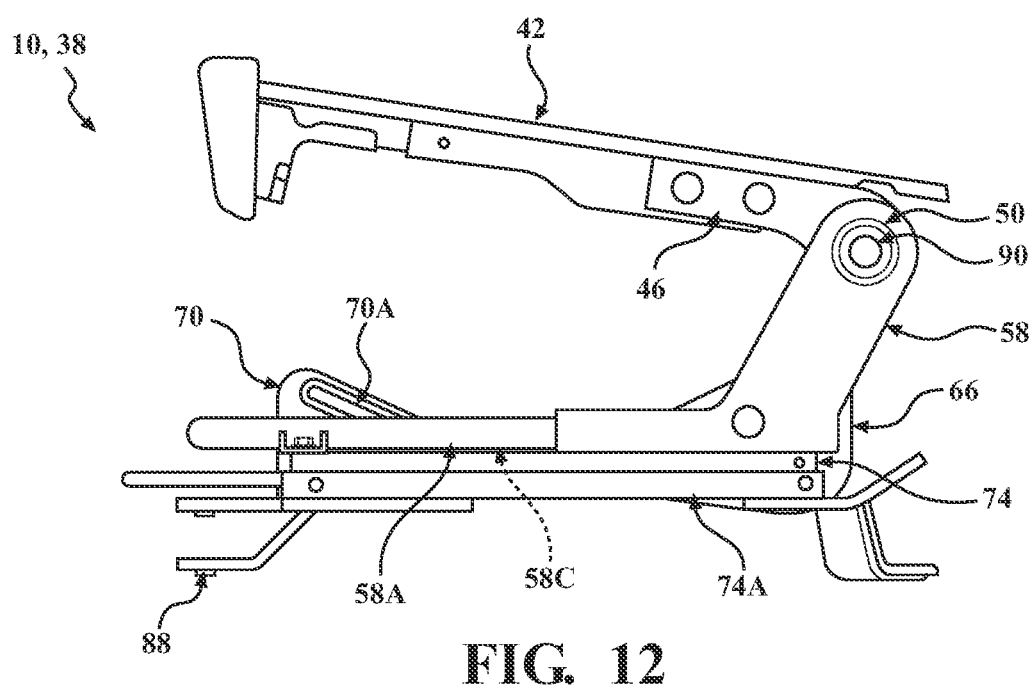
FIG. 12 is a side view of the seat assembly of FIG. 11, illustrating relative positions of the seatback and the seat cushion when the seat assembly is in the first folded position.

Referring to FIG. 10, the seat assembly 10 of FIG. 9A is shown in the design seating position 30 prior to repositioning the seat assembly 10 into the first folded position 38 shown in FIGS. 11 and 12. When the seat assembly 10 is in the design seating position 30, the boss 66A projecting from the hockey stick assembly 66 is positioned at the lower end 70B of the slot 70A in the guide bracket 70. Rotating the recliner lever 78 to the actuated position 78', as illustrated by arrow A, releases the seatback 42 such that the seatback 42 can be rotated towards the seat cushion 58C, as illustrated by arrow G. More specifically, when the towel bar 86 is in an unactuated position such that the track 74 is retained in a fixed position with respect to the fixed track 74A, actuating the recliner lever 78 unlocks the recliners 50,50' and allows the seatback 42 to be rotated towards the seat cushion 58C, placing the seat assembly 10 in the folded position 38. Further, when the towel bar 86 is in the actuated position 86' such that the track 74 is unlocked from the fixed track 74A, actuating the recliner lever 78 still unlocks the recliners 50,50' and allows the seatback 42 to be rotated towards the seat cushion 58C, placing the seat assembly 10 in the folded position 38. Thus, the recliners 50,50' can be placed in the unlocked condition (by actuating the recliner lever 78) independent of the current position of the towel bar 86. FIGS. 11 and 12 show the seat assembly 10 in the first folded position 38 when the seat assembly 10 has been folded from the design seating position 30 shown in FIG. 10.

Figure 13:
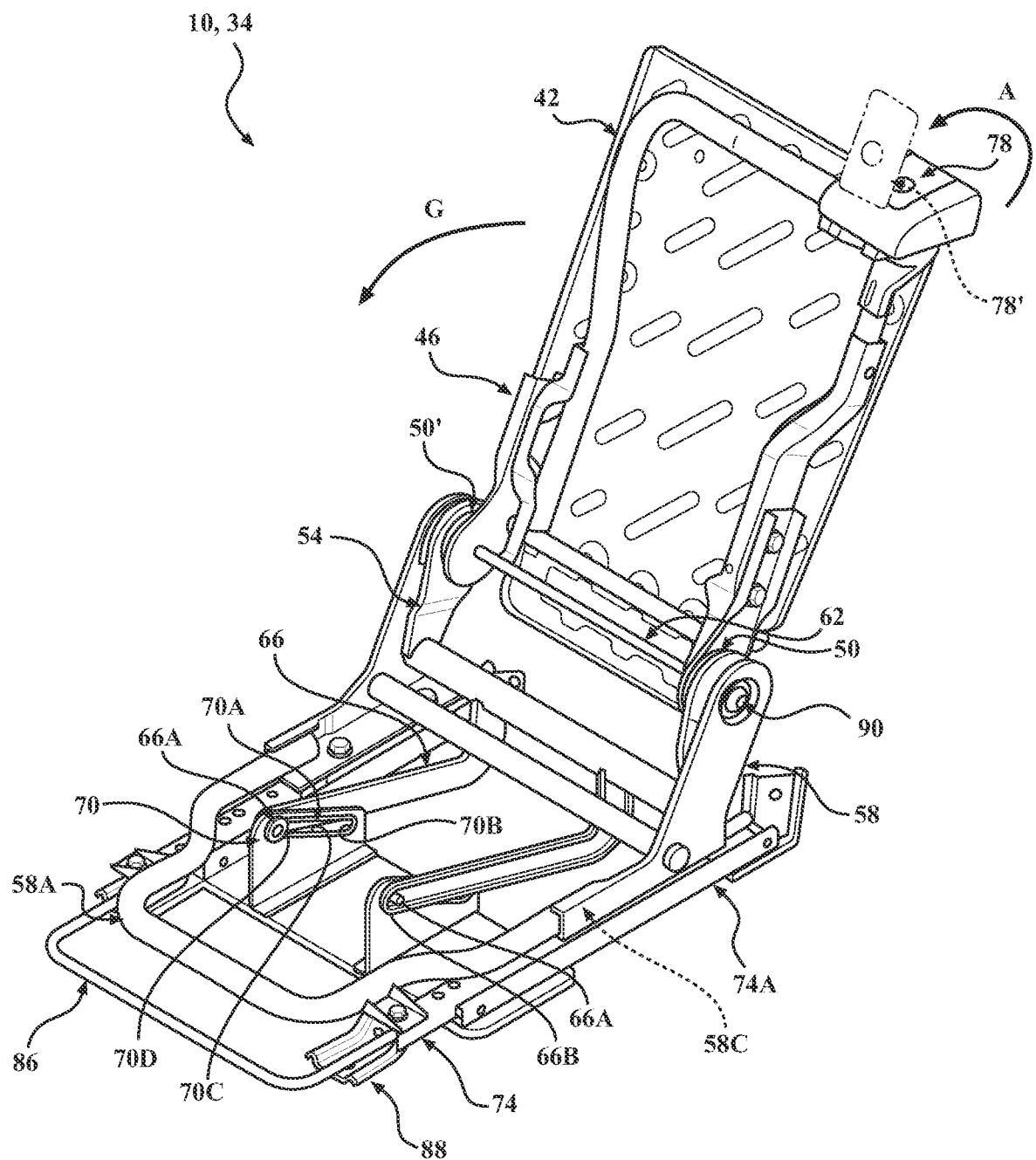
FIG. 13 is a perspective view of the seat assembly of FIG. 9B in the slouch position, illustrating the recliner lever being actuated.
Figure 14:
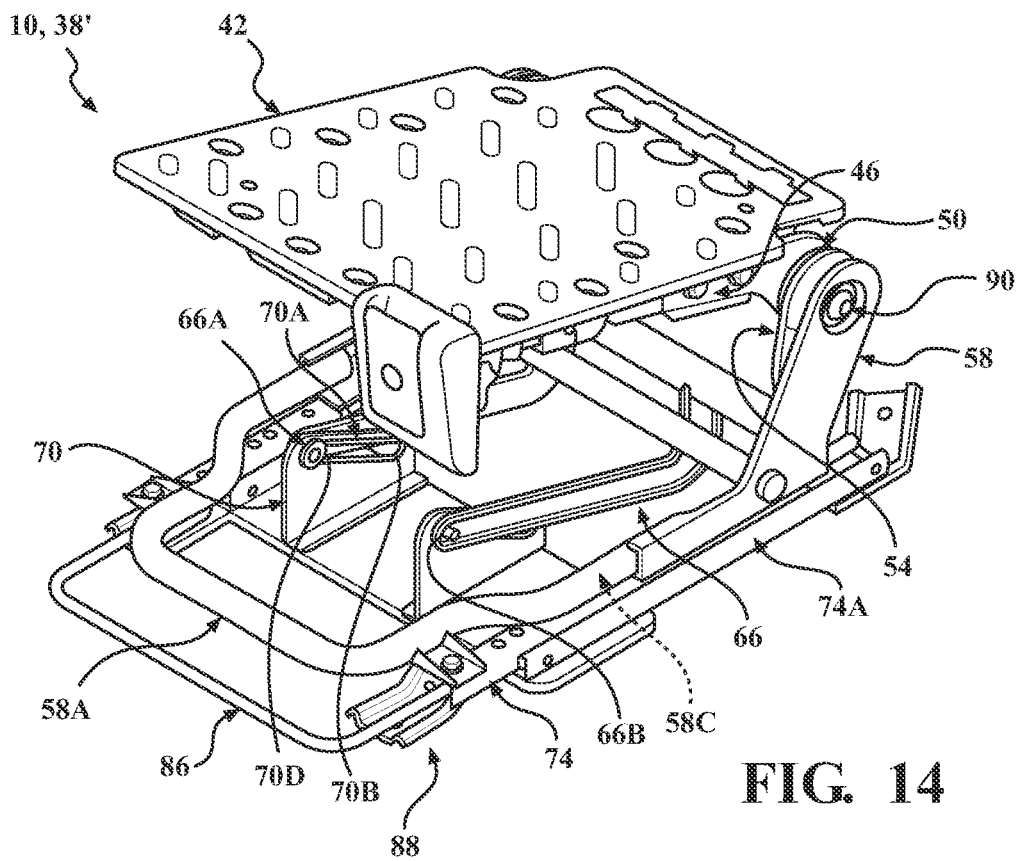
FIG. 14 is a perspective view of the seat assembly of FIG. 13 repositioned from the slouch position to a second folded position.
Figure 15:
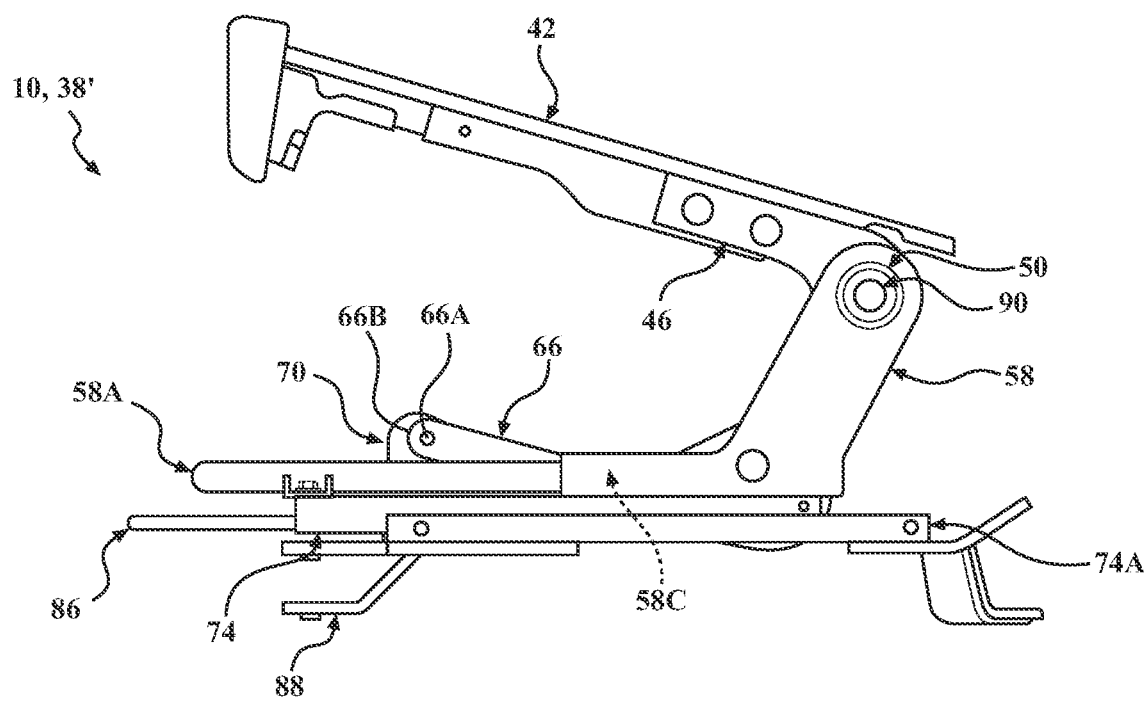
FIG. 15 is a side view of the seat assembly of FIG. 14, illustrating the relative positions of the seatback and the seat cushion when the seat assembly is in the second folded position.

Referring to FIG. 13, the seat assembly 10 of FIG. 9B is shown in the slouch position 34 prior to repositioning the seat assembly 10 into a second folded position 38' shown in FIGS. 14 and 15. When the seat assembly 10 is in the slouch position 34, the boss 66A projecting from the hockey stick assembly 66 is positioned at the upper end 70D of the slot 70A in the guide bracket 70. Rotating the recliner lever 78 to the actuated position 78', as illustrated by arrow A, releases the seatback 42 such that the seatback 42 can be rotated towards the seat cushion 58C, as illustrated by arrow G. More specifically, when the towel bar 86 is in an unactuated position such that the track 74 is retained in a fixed position with respect to the fixed track 74A, actuating the recliner lever 78 unlocks the recliners 50,50' and allows the seatback 42 to be rotated towards the seat cushion 58C, placing the seat assembly 10 in the second folded position 38'. FIGS. 14 and 15 show the seat assembly 10 in the second folded position 38' when the seat assembly 10 has been folded from the slouch position 34 shown in FIG. 13.

Figure 16:
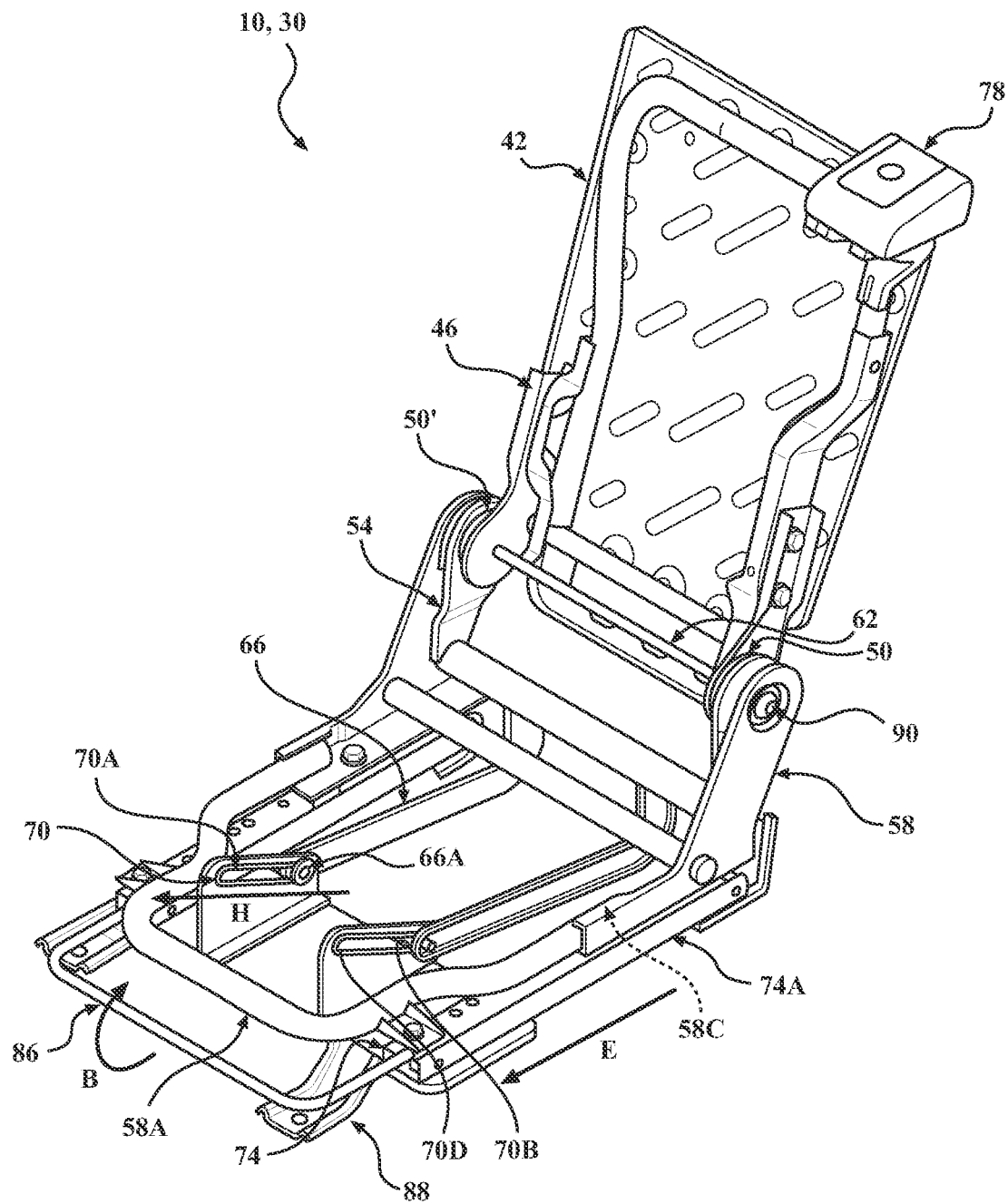
FIG. 16 is a perspective view of the seat assembly of FIG. 10 in the design seating position, illustrating hockey stick link travel in a slot in a guide bracket and seat/track travel.
Figure 17:
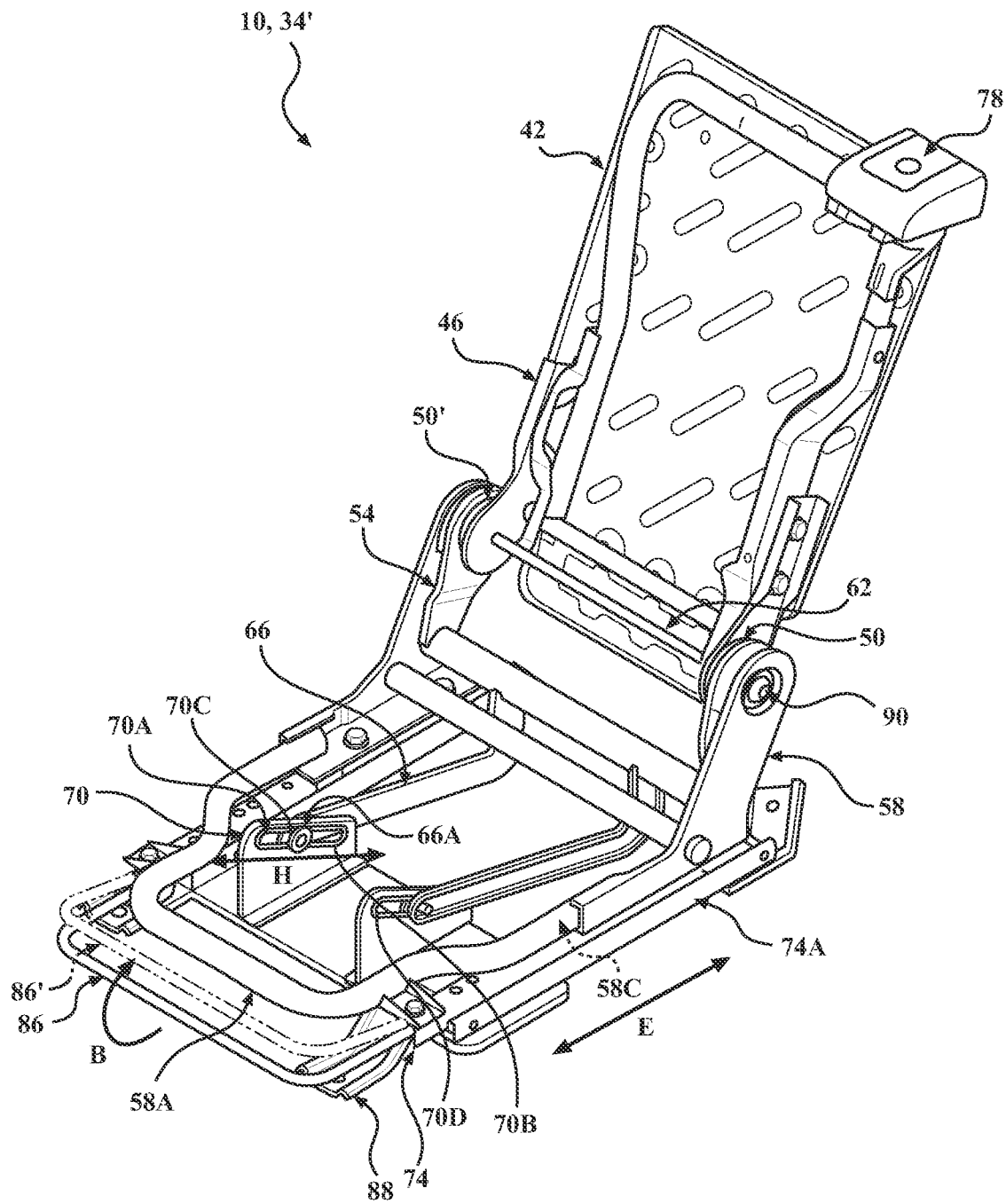
FIG. 17 is a perspective view of the seat assembly of FIG. 16 repositioned into a mid-position, illustrating hockey stick link travel in the slot in the guide bracket and seat/track travel.
Figure 18:
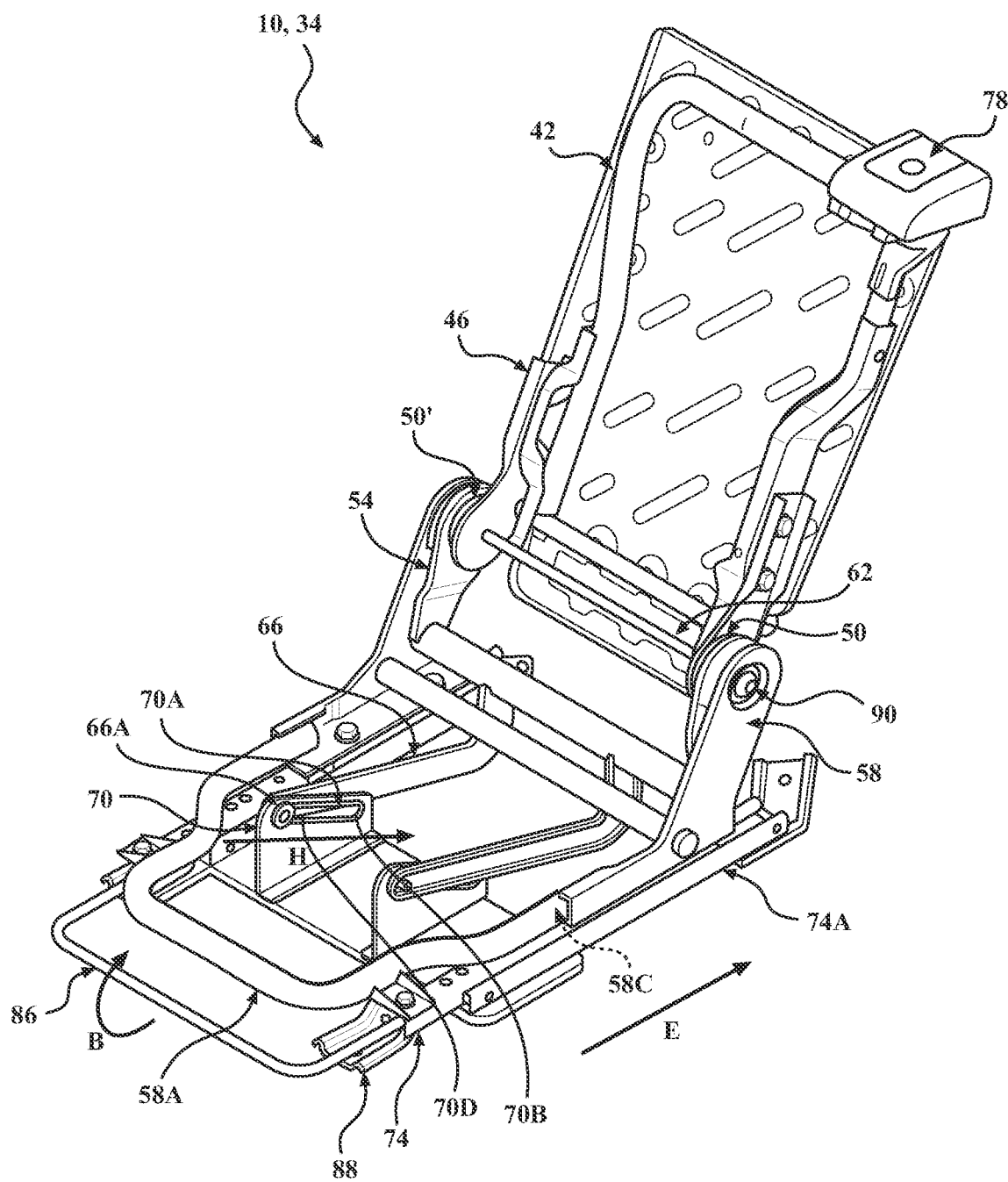
FIG. 18 is a perspective view of the seat assembly of FIG. 17 repositioned into a forward position, illustrating hockey stick link travel in the slot in the guide bracket and seat/track travel.

FIGS. 16 through 18 illustrate seat/track travel (illustrated by arrow E) to form incremental slouch positions 34, 34', according to embodiments as disclosed herein. Referring to FIG. 16, the seat assembly 10 is shown in the design seating position 30 with the recliner lever 78 unactuated and the recliners 50,50' in a locked condition. When the recliners 50,50' are locked, the first recliner bracket 46 is fixedly coupled to the second recliner bracket 54. Actuating the towel bar 86, as illustrated by arrow B, unlocks the track 74 and allows the seat cushion 58C to slide in the direction of arrow E along the fixed track 74A. The movement of the seat cushion 58C in the direction of arrow E causes the boss 66A projecting from the hockey stick assembly 66 to slide upward along the slot 70A in the guide bracket 70, as illustrated by arrow H. Releasing the towel bar 86 locks the track 74 in a selected position with respect to the fixed track 74A. As such, the seat cushion 58C can be positioned at any point along the fixed track 74A within a predefined zone. The predefined zone is defined by a rearward position wherein the seat cushion 58C is in the design seating position 30 and a forward position wherein the seat cushion 58C is in the slouch position 34 and the boss 66A projecting from the hockey stick assembly 66 is at the upper end 70D of the slot 70A in the guide bracket 70.

Referring to FIG. 17, the seat assembly 10 can be selectively positioned in any one of incremental slouch positions 34' between the design seating position 30 shown in FIG. 16 and the slouch position 34 shown in FIG. 18. For example, when the seat assembly 10 is in the design seating position 30 shown in FIG. 16, the towel bar 86 can be actuated (arrow B) allowing the seat cushion 58C to slide forward along the fixed track 74A (arrow E). Movement of the seat cushion 58C in the forward direction (arrow E) along the fixed track 74A results in the boss 66A projecting from the hockey stick assembly 66 to slide upward along the slot 70A in the guide bracket 70, as illustrated by arrow H.

When the seat cushion 58C is positioned at a desired incremental slouch 34', such as illustrated in FIG. 17, the towel bar 86 is released causing the track 74 to be locked in a desired position along the fixed track 74A. The boss 66A projecting from the hockey stick assembly 66 is positioned midway 70C along the slot 70A when the seat assembly 10 is in one of the incremental slouch positions 34'. The specific midway location 70C of the boss 66A within the slot 70A is based on the specific location of the seat cushion 58C along the fixed track 74A. As such, the selected position of the boss 66A within the slot 70A can be midway 70C between the opposing ends 70B, 70D of the slot 70A, between the midway position 70C and the lower end 70B of the slot 70A, and/or between the midway position 70C and the upper end 70D of the slot 70A.

When the seat assembly 10 is positioned at any one of the incremental slouch positions 34', such as the mid slouch position 34' shown in FIG. 17, actuating the towel bar 86 (illustrated by arrow B) unlocks the track 74 such that the track 74 can be repositioned along the fixed track 74A in a forward direction or in a rearward direction as illustrated by arrow E. For example, when the seat assembly 10 is positioned at the incremental slouch position 34', actuating the towel bar 86 allows the seat cushion 58C to either slide forward along the fixed track 74A to the full slouch position 34 shown in FIG. 18 or slide rearward along the fixed track 74A towards the design seating position 30 shown in FIG. 16. Likewise, the boss 66A slides forward/rearward along the slot 70A, as illustrated by arrow H, in the same relative direction (forward/rearward) as the seat cushion 58C is moved along the fixed track 74A.

When the seat assembly 10 is in the full slouch position 34 shown in FIG. 18, actuating the towel bar 86, as illustrated by arrow B, unlocks the track 74 and allows the seat cushion 58C to slide rearward along the fixed track 74A, as illustrated by arrow E. When the seat cushion 58C slides rearward along the fixed track 74A, the boss 66*a* projecting from the hockey stick assembly 66 slides downward and rearward within the slot 70A in the guide bracket 70, as illustrated by arrow H. The seat assembly 10 can be repositioned from the slouch position 34 to any selected incremental slouch position 34' (FIG. 17) or can repositioned into the design seating position 30 shown in FIG. 16.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

One benefit of the embodiments disclosed herein is the seat assembly 10 has a common pivot construction between the seatback 42, the seat cushion 58C, and the hockey stick assembly 66. A second benefit of the embodiments disclosed herein is the seat assembly 10 provides a free-standing seat that lacks excessive components, such as a seatback striker rods, bars, latches, pivots, recliners, and the like. A third benefit of the embodiments disclosed herein is the seat assembly 10 provides control of seatback 42 orientation by using a slot 70A in a guide bracket 70. A fourth benefit of the embodiments disclosed herein is the seat assembly 10 provides a slouch function with an independent seatback 42 fold function. A fifth benefit of the embodiments disclosed herein is the seat assembly 10 provides the slouch function and/or the seatback 42 fold function using mechanical locking devices and/or power operated motor(s).

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat assembly for a vehicle, comprising:
a seatback;
a first recliner bracket fixedly coupled to said seatback;
a seat cushion comprising a cushion bracket;
a recliner pivotally connecting a second recliner bracket to said first recliner bracket;
a recliner release lever provided to operate said recliner for pivoting said seatback;
a hockey stick assembly pivotally connected to said seatback and said first recliner bracket through said recliner and said second recliner bracket;
said cushion bracket pivotally connected to said hockey stick assembly and the second recliner bracket through a free pivot joint; and
a track coupled to said seat cushion and slidably coupled to a fixed track wherein said cushion bracket and said hockey stick assembly slide along with said track as said track slides along said fixed track;
wherein said hockey stick assembly pivotally repositions said seatback between a design seating position and a slouch position as said track slides along said fixed track.

2. The seat assembly of claim 1, further comprising a guide bracket fixedly coupled to said fixed track such that said guide bracket retains its position with respect to said fixed track as said track is repositioned along said fixed track;
wherein said hockey stick assembly is guided to travel in a slot in said guide bracket such that said seatback is actuated to move between said design seating position and said slouch position as said track is repositioned along said fixed track.

3. The seat assembly of claim 2, wherein:
said hockey stick assembly includes a hockey stick bracket pivotally connected with said cushion bracket;
a boss projecting from said hockey stick bracket extends at least partially through said slot in said guide bracket; and
said boss is guided in said slot for adjusting said seatback between said design seating position and said slouch position as said track is repositioned along said fixed track.

4. The seat assembly of claim 3, wherein said seatback is incrementally adjustable between said design seating position and said slouch position.

5. The seat assembly of claim 4, wherein said recliner is actuated to an unlocked condition for pivoting said seatback from said design seating position to a folded position overlying said seat cushion.

6. The seat assembly of claim 5, wherein when said seat assembly is in said slouch position and said recliner actuated to said unlocked condition, said seatback is repositionable between said design seating position and said folded position.

7. The seat assembly of claim 6, further comprising a towel bar configured to unlock said track such that said seat cushion and said track are slidable along said fixed track.

8. The seat assembly of claim 7, wherein said towel bar is actuated to unlock said track which slides the said seat cushion and said cushion bracket along said fixed track.

9. The seat assembly of claim 8, wherein said track is slidable in a forward direction along said fixed track when said towel bar is actuated to unlock said track.

10. The seat assembly of claim 9, wherein said track is slidable in a rearward direction towards said design seating position along said fixed track when said towel bar is actuated to unlock said track.

11. The seat assembly of claim 6, wherein:
said track comprises a power track configured to slide said seat cushion on said fixed track; and
said cushion bracket and said hockey stick assembly slide along with said power track as said power track is repositioned along said fixed track.

12. The seat assembly of claim 6, comprising a recliner lever to pivot said seatback between said design seating position and said folded position.

13. The seat assembly of claim 12, wherein said recliner lever is operatively coupled to said recliner release lever such that actuating said recliner lever actuates said recliner release lever unlocking said recliner.

14. The seat assembly of claim 6, comprising a dual-sided recliner configuration.

15. The seat assembly of claim 14, wherein said dual-sided recliner configuration comprises a first recliner and a second recliner, said first and second recliners being operatively coupled by a synchronization rod.

16. The seat assembly of claim 14, wherein said dual-sided recliner configuration comprises a first recliner and a second recliner, said first and second recliners being operatively coupled by a cable.

17. The seat assembly of claim 6, comprising a single-sided recliner configuration.

\* \* \* \* \*